INVENTOR.
Jorma O. Sarto.
BY
Harness and Harris
ATTORNEYS.

April 7, 1953 J. O. SARTO 2,633,704
FUEL-AIR RATIO REGULATOR FOR GAS TURBINE POWER PLANTS
Filed Aug. 14, 1947 4 Sheets-Sheet 3

INVENTOR.
Jorma O. Sarto.
BY
Harness and Harris
ATTORNEYS.

INVENTOR.
Jorma O. Sarto.
BY
Harness and Harris
ATTORNEYS.

Patented Apr. 7, 1953

2,633,704

UNITED STATES PATENT OFFICE 2,633,704

FUEL-AIR RATIO REGULATOR FOR GAS TURBINE POWER PLANTS

Jorma O. Sarto, Walled Lake, Mich., assignor to Chrysler Corporation, Highland Park, Mich., a corporation of Delaware Application August 14, 1947, Serial No. 768,685

15 Claims. (Cl. 60—39.28)

This application relates to a control for a burner. More specifically it relates to controlling a burner adapted to supply products of combustion driving a gas turbine.

An object of the present invention is to provide a stabilizing means for a fuel-burning apparatus. The stabilizing means is advantageously used when the fuel-burning apparatus produces hot gases for a gas turbine, whereby the operation of the turbine is stabilized. It has been determined that the gas turbine should be operated at constant temperature; i. e., the temperature of the gas driving the turbine should be constant. At constant-temperature operation the curves of turbine output torque against speed and required torque against speed are so nearly parallel throughout much of the operating range that stable operation at constant speed is virtually impossible without involving the speed governor itself. When the turbine drives an airplane propeller, the propeller speed is governed through pitch control, and so in this case an attempt at stable operation will involve an undue amount of propeller-pitch changing. I propose to eliminate this drawback by providing for allowing small variations from the selected constant temperature of gases driving the turbine. In this way the curve of turbine output torque against speed is caused to intersect the curve of propeller torque against speed, and stable operation is achieved without a variation beyond the speed range allowed by the propeller governor.

The means providing for departure from the constant-temperature operation of the turbine may take the form of a special fuel orifice that is adjusted for adjustment of the relation of fuel-flow rate to a fuel-pressure difference that is measured in the fuel path and is normally used to regulate fuel flow in conjunction with an air-pressure difference indicative of air-flow rate.

A further object is to associate with the special orifice, a means under control of an operator for adjusting the orifice to modify the fuel-air rate to facilitate change to a new speed and to restore the original fuel-air rate when the new desired speed is reached.

Other objects will appear from the disclosure.

Figure 1:
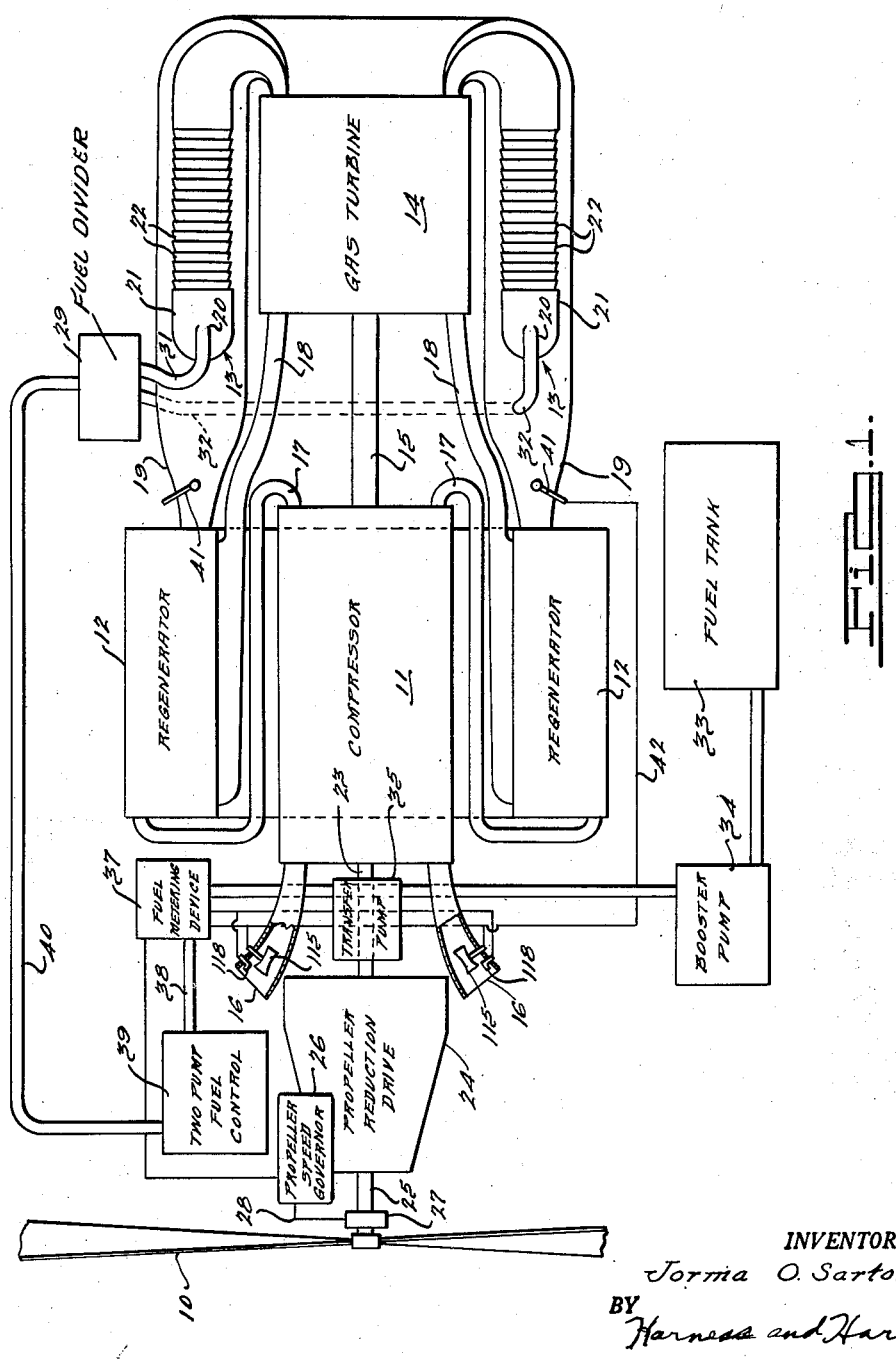
Fig. 1 is a partially diagrammatic view showing a power plant including a gas turbine to which the controls of the present invention are shown to be applied.

Fig. 1 shows a power plant for driving an airplane propeller 10. The power plant comprises a compressor 11, a regenerator 12 surrounding the compressor, a plurality of burners 13, and a gas turbine 14. The gas turbine 14 is driven by hot gases produced by the combustion of fuel and air in the burners 13, and drives the compressor 11 through appropriate connecting means represented by the reference character 15. The compressor 11, which may be of the axial type, draws in air at its left end through scoops 16. Compressed air is delivered from the right end of the compressor 11 into conduit means 17 which lead the compressed air to the regenerator 12. The compressed air follows a zig-zag path through the regenerator 12 and is thereby heated by exhaust gases passing from the gas turbine 14 through conduit means 18 to the regenerator 12. Heated compressed air passes from the regenerator 12 through conduit means 19 which enclose the burners 13. Each burner is formed of a fuel nozzle 20 and an air tube 21 formed at an intermediate portion of nested frustum-like sections 22, which permit the air to pass through the tube wall to the nozzles 20. The tubes 21 are curved at their ends to direct the streams of hot gases formed in the burners 13 toward the end of the gas turbine 14, which is positioned within the burners 13. For a more complete showing of the arrangement of compressor, regenerator, burners, and gas turbine, reference is made to the copending application of Staley and Williams, Serial No. 715,840, dated December 12, 1946. For a more complete showing of the burner tubes 21 with the frustum-like sections 22, reference is made to the copending application of Samuel B. Williams, Serial No. 715,873, filed December 12, 1946, now U. S. Patent No. 2,603,064.

The compressor 11, which has been previously described as being driven from the gas turbine 14 through means 15, is drivingly connected by means 23 with a propeller reduction drive 24, which in turn drives the shaft 25 on which the propeller 10 is mounted. Thus the propeller 10 is driven from the gas turbine 14 at a reduced speed. A propeller speed governor 26, which includes parts responsive to the speed of the propeller 10 is diagrammatically illustrated as regulating a propeller pitch control means 27 through a connection 28.

Fuel divider 29 is connected with the nozzles 20 through conduits 31 and 32. Fuel is fed from a fuel tank 33 to a booster pump 34 and thence to a transfer pump 35. From the transfer pump 35 the fuel is led by a conduit 36 to a fuel-metering device 37. Thence the fuel proceeds by way of a conduit 38 to a two-pump control 39 and thence through a conduit 40 to the fuel divider 29.

In the conduit means 19 is positioned a plurality of devices 41 responsive to temperature of the air passing from the regenerator 12 to the burners 13. The temperature-responsive devices 41 are connected by means 42 with pressure-sensing devices 115 and 118 in each air scoop 16. The difference between the pressures sensed by the elements 115 and 118 is indicative of air-flow rate in the scoop and is to be transmitted to the fuel-metering device 37. The temperature-responsive element 41 acts through the connection 42 to reduce the pressure difference transmitted by an amount dependent upon the temperature in the conduit means 19.

Figures 2, 3:
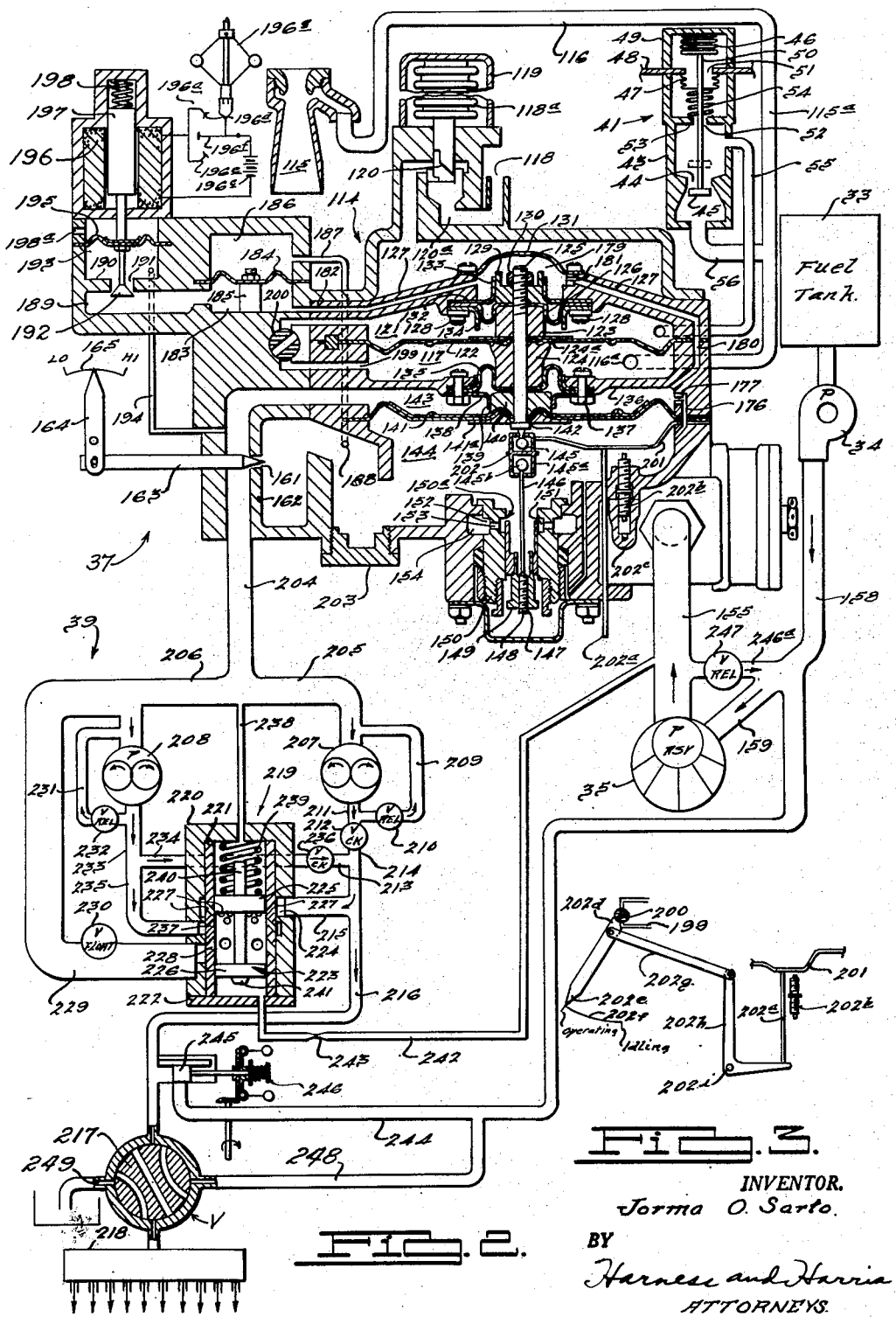
Fig. 2 is a view partially in section showing the application of the controls of the present invention to a fuel-and-air-metering device.
Fig. 3 is a fragmentary view of a control used in Fig. 2.

Fig. 2 shows in detail the fuel-metering device 37 and the two-pump control 39. Reference character 114 designates a body which may be formed of several parts and through which fuel is passed for regulating purposes. The body 114 forms part of the metering device 37. The line 116 connects the velocity-pressure-sensing element 115 with the body 114, the line 116 having an opening 116a to an air chamber 117, formed in the body 114 below a diaphragm 122. The impact-pressure-sensing element 118 is shown to be formed to be part of the body 114 and includes a pressure-compensating nitrogen-filled bellows 118a mounted on the inside of the top of a container 119. Bellows 118a contains nitrogen at some pressure dependent on conditions such as the spring rate of the bellows and compensates for temperature and pressure. The bellows 118a contracts with pressure and expands with temperature and therefore, assumes a position dependent upon density, since density is proportional to the ratio of pressure to temperature. A valve 120 is connected with the nitrogen bellows 118a and is adjustably positioned by the bellows 120a to establish a restriction in a line 120a transmitting the signal received by the pressure element 118 to an air chamber 121 formed in the body 114 above an air diaphragm 122, mounted within the body 114. The pressure of air sensed by the element 118 is transmitted to the upper side of this diaphragm, and the pressure sensed by the element 115 is transmitted to the lower side of the diaphragm through line 115a. Whenever air is flowing, the pressure on the upper side of the diaphragm 122 will be greater than the pressure on the lower side thereof, and the difference in these pressures is a measure of the square of the air flow.

The pressure difference transmitted to the air diaphragm 122 differs from the difference between the pressures sensed by elements 118 and 115 because of the action of the temperature-responsive device 41. This device comprises a body 43, having a valve opening 44, a valve 45 cooperable with the valve opening, a bellows 46 filled, for example, with a liquid, and a bellows seal 47. The body 43 is mounted on a wall 48, which may be part of the conduit means 19. The device 41 also includes a framework 49 mounted on the wall 48 and projecting within the conduit means 19. The bellows 46 is supported on the framework 49, and is connected with an end of a valve rod 50. The valve rod 50 passes through an opening 51 in the wall 48 and passes through and is attached to the bellows seal 47. The valve rod also extends through an opening 52 in an internal shoulder 53 formed on the body 43. A spring 54 acts between the shoulder 53 and the bellows seal 47 to urge the valve 45 and its rod 50 upwardly as viewed in Fig. 2. A line 55 connects the body 43 above the valve opening 44 and the body 114 below the diaphragm 114. A line 56 connects the body 43 below the valve opening 43 and the line 115a.

As the temperature of air flowing to the burners 13 (within the wall 48, Fig. 2, or the conduit means 19, Fig. 1) increases, the bellows 46 expands, and the portions thereof connected to the valve rod 50 move downwards, as viewed in Fig. 2, causing the valve 45 to increase the effective size of valve opening 44 or to decrease the amount of restriction of the opening. Decrease in restriction of this opening reduces the difference in pressures in the lines leading from the sensing elements 115 and 118 to the chambers 121 and 117 at the upper and lower sides of the diaphragm 122. Thus for any given condition in which the valve 45 provides some opening of the valve opening 44, the air-pressure difference transmitted to the diaphragm 122 is less than the air-pressure difference at sensing elements 115 and 118, and the greater the effective size of the valve opening 44 due to lowering of valve 45 due in turn to increase in temperature of air flowing to the burners 13, the smaller the air-pressure difference transmitted to the air diaphragm 122 for a given air-pressure difference at the sensing elements 118 and 115. The purpose of this arrangement will be more fully explained after the balance of the fuel-metering device has been described.

If the bellows 46 and/or the bellows seal 47 fails, the spring 54 will move the valve 45 to the dotted line position above the valve opening 44, in which position the restriction of the valve opening 45 is very small or non-existent. The diaphragm 122 is held between a collar 124 and a ribbed disk washer 124a mounted upon a rod 125. Above the washer is a collar 123, above which is a diaphragm 126, which is secured to bridge portions 127 of the body 114 by screws 128. The collar 123 and a collar 129 clamp the diaphragm 126. The collar has a recess receiving a nut 130 having threaded engagement with the rod 125. The bridge portions 127 are connected by a cover 131 which extends over the top of the rod 125. Clamped between the diaphragm 126 and the bridge portions 127 is a guide 132 having a flange 133 in which the collar 129 slides. The diaphragm 126 is retained in a flanged support 134, which is clamped to the bridge portions 127 by the screws 128. The collar 124 rests in a diaphragm 135, which closes an opening in a wall 136 dividing the body 114 into an air section and a fuel section. Bolts 137 secure the diaphragm 135 to the wall 136. These bolts also support a guide 138 having a flange 139 receiving a collar 140. Collar 140 holds a diaphragm 141 against a ribbed disk washer 141a which rests against a shoulder 142 on the rod 125. The various diaphragms and collars just described are held clamped between the shoulder 142 on the rod 125 and the nut 130 engaging the upper threaded end of the rod 125. The diaphragm 141 divides the fuel section into a metered-fuel chamber 143 and an unmetered-fuel chamber 144. The lower end of the rod 125 is formed as a ball 145, which is mounted in a connecting means 145a, which also mounts a ball 145b on the upper end of a rod 146. The lower end of the rod 146 has a threaded portion 147 and a slot 148 for adjusting purposes. The threaded portion 147 engages a movable inner sleeve valve 149, which is slidably mounted in a fixed outer sleeve valve 150. The valves 149 and 150 comprise an adjustable regulating orifice 150$^a$.

The outer valve 150 has an inner annular recess 151, an outer annular recess 152, and connecting radial openings 153. As shown in Fig. 3, the inner valve 149 partially overlaps the inner recess 151 of the outer valve so as to restrict the openings formed therein. The outer annular recess 152 of the outer valve 150 is in registry with an annular recess 154 formed in the body 114. The recess 154 is in communication through means not shown, with a supply conduit 155. Fuel comes from the fuel tank 33 to the booster pump 34, which may be of the centrifugal type. Thence it proceeds by way of conduits 158 and 159 to the transfer pump 35, which may be of the rotary sliding vane type. The pump 35 delivers fuel through the conduit 155 to the recess 154 in the body 114. Thence the fuel proceeds through the regulating orifice 150$^a$ formed of the sleeves 149 and 150 to the unmetered-fuel chamber 144 in the body 114 below the diaphragm 141. An orifice 161, formed in a wall 162, connects the metered- and unmetered-fuel chambers.

The fuel orifice 161 is regulated by means of a longitudinally adjustable needle valve 163, to which is connected a pivotally mounted indicator 164, having a point moving along suitable indicia 165, representing desired temperature of combustion products delivered by the burners to the gas turbine. The indicator 164 and needle valve 163 are shown in a mean position. Movement of the needle valve to the left, produced by clockwise angular movement of the indicator, increases the effective opening of the fuel orifice 161 and thereby increases the temperature to be reached by the products of combustion of the burners going to the turbine. Movement of the needle valve 163 to the right produced by counterclockwise angular movement of the indicator 164 will decrease the effective opening of the fuel orifice 161 and thereby decrease the temperature of the products of combustion produced by the burners.

The fuel chambers 143 and 144 above and below the diaphragm 141 are placed in communication by a passage 176 formed in the body 114 and having a restriction 177. The metered-fuel chamber 143 is in communication with a chamber 179 for fuel formed by the cover 131, the bridge portions 127, and the diaphragm 126. Communication is established through a passage 180 formed in the body 114 and having a restriction 181 at the end adjacent the chamber 179. A passage 182 in one bridge portion 127 connects the chamber 179 with a chamber 183, formed below a diaphragm 184 carrying a projection 185 limiting the lower position of the diaphragm 184. Above the diaphragm 184 is a chamber 186, which communicates by a line 187 with the unmetered-fuel chamber 144 through an opening 188. The chamber 183 is connected with a chamber 189 positioned below a wall 190 having an orifice 191 closed by a valve 192, as shown in Fig. 2. Above the wall 190 is a chamber 193, which communicates through a line 194 with the metered-fuel chamber 143. The top of the chamber 193 is formed by a diaphragm 195, which is connected to the stem of the valve 192 and prevents fuel from going from the chamber 193 into a solenoid 196. The solenoid 196 controls the valve 192 through a plunger 197, secured to the stem of the valve 192 in axial alignment therewith. The solenoid 196 is supplied by wires 196$^a$ and 196$^b$ from a source of electrical power 196$^c$. Between the wire 196$^a$ and source 196$^c$ is connected a speed-responsive switch, which comprises spaced terminals 196$^d$ and 196$^e$, connected to the line 196$^a$, and a contactor arm 196$^f$, controlled by a means 196$^g$ responsive to turbine speed. More specifically, the means 196$^g$ may be associated with the propeller-pitch-control governor. Propeller speed is directly proportional to turbine speed. The propeller is normally constructed so that a certain pitch produces a given speed range of propeller. Different speed ranges may be preselected, and thus a position of the arm 196$^f$ between the contacts 196$^d$ and 196$^e$ may be produced by different selected speed ranges. The arrangement is such that, when the turbine is operating in the desired speed range, the contactor 196$^f$ is positioned between the terminals 196$^d$ and 196$^e$ and out of contact with each of them so that no current flows to the solenoid 196. Under this condition, fuel pressure acting upwardly against the diaphragm 193 causes the plunger 197 to be displaced upwards from a central position in the solenoid 196 and the valve 192 to close the orifice 191, all as shown in Fig. 2. When the turbine is not operating in the desired speed range, the arm 196$^f$ will contact one of terminals 196$^d$ and 196$^e$, causing current to be supplied to the solenoid 196, which now moves the plunger 197 downward to a central position and opens the valve 192, placing the chambers 189 and 193 in communication. A spring 198 acts against the plunger 197 to urge it downwards and thereby provides compensation for a fuel pressure in the fuel chamber 193. The space above the diaphragm 193 is vented by an opening 198$^a$. The air chambers 117 and 121 are connected by a passage 199, which is shown to be closed by a valve 200. A spring 201 is connected at its right end to the body 114 below the diaphragm 141 in the unmetered-fuel chamber 144. The left end of the spring 201 is engageable with a flange 202 formed on the connecting means 145$^a$ so as to provide a yielding limit to upward movement of the stems 125 and 146 and a minimum opening of the regulating orifice 150$^a$, formed by the valves 149 and 150. A rod 202$^a$ slidably mounted in the body 114 may be moved upwardly from the position shown to lift the spring 201 and thereby to remove the lower limit on the side of the regulating orifice 150$^a$. A threaded member 202$^b$, mounted in the body 114, provides an adjustable stop engageable with the spring 201 so as to determine the position the spring will assume when the rod 202$^a$ is out of the way, as shown in Fig. 2. A removable cover 202$^c$ protects the threaded member 202$^b$. The fuel chamber has a drain plug 203.

Fig. 3 shows means for interconnecting the valve 200 and the rod 202$^a$. An arm 202$^d$ is attached at one end to the valve 200 and has the other end shaped as a pointer 202$^e$, positioned at indicia 202$^f$ indicating through "operating" and "idling" closed and open positions of the valve 200. A link 202$^g$ connects a mid-point of the arm 202$^d$ and one arm of a bell-crank 202$^h$ pivoted at 202$^i$. The other arm of the bell-crank 202$^h$ engages one end of the end 202$^a$. The arrangement is such that when the valve 200 closes the passage 199 so that the air diaphragm 122 is subjected to the two different air pressures sensed by the elements 115 and 118, the bell-crank 202h has caused the rod 202a to lift the idle spring 201 from the adjustable stop 202b, allowing the valve 149 to seek a position dependent on the air and fuel forces on the diaphragms 122 and 141. At starting and idling conditions it is desirable to have a certain minimum fuel flow that will be independent of gusts of air that might cause the air diaphragm 122 to shift the valve 149. This minimum fuel flow at idling or starting will be higher than the possible minimum flow during flight conditions when the parts are as shown in Figs. 2 and 3. Accordingly, the arm 202e is moved counterclockwise from the position of Fig. 3 to a vertical position in which the valve 200 opens the passage 199, thereby equalizing the air pressures on the air diaphragm 122. At the same time the horizontal arm of the bell-crank 202h moves downward, allowing the idle spring 201 to move itself and the rod 202a downward until the spring contacts the stop 202b. Now the valve 149 is free of air-flow forces and is held in idling position by engagement of the spring 201 with the flange 202.

A fuel line 204 extends from a region of the metered fuel chamber 143 immediately to the left of the fuel orifices 161 and 161a. The line 204 splits into branches 205 and 206, which lead to pumps 207 and 208, which may be of the gear type. A relief line 209 is connected to opposite sides of the pump 207 and contains a relief valve 210. The pump 207 discharges through a line 211 and a check valve 212 from which lead lines 213 and 214. The line 214 is formed into two branches 215 and 216. The latter line leads through a valve 217 to a flow divider 218 from which separate lines go to individual burners. The line 215 forms part of a bypass for pump 207 and leads to a valve 219 formed of a body 220, a sleeve 221 positioned therein, a cover 222 and a balanced piston valve 223 slidable within the sleeve 221. The line 215 leads directly to an annular recess 224 formed in the body 220 about the sleeve 221. The annular recess 224 communicates with the space between sections 225 and 226 of the piston valve 223 by way of passages 227 formed in the sleeve 221. Passages 228 in sleeve 221 provide communication from the space between the piston valve sections 225 and 226 and a drain line 229 leading back to the line 206. The drain line 229 carries a float valve 230 for eliminating from the line any trapped fuel vapors. The pump 208 is provided with a relief line 231 which is connected to opposite sides of the pump and carries a relief valve 232. A conduit 233 leads from the discharge side of the pump 208 and separates into two branches 234 and 235. The branch 234 is connected by a check valve 236 with the branch 213 associated with the pump 207. The branch 235 leads to the valve body 220 and communicates with the chamber between the piston valve sections 225 and 226 by means of openings 237 formed in the sleeve valve 221. The space above the piston valve 223 is connected by a line 238 with the conduit 204 and subjects the top side of the piston valve to the fuel pressure in the line 204. A coil spring 239 acts against the top of the piston valve 223 to urge it downwardly. An extension 240 formed on the top of the piston valve 223 limits upward movement of the piston valve. A short extension 241 formed on the lower side of the piston valve 223 limits its downward movement. The space below the piston valve 223 is connected by a line 242 having a restriction 243 to the discharge side of the transfer pump 160. Fundamentally, the control valve 219 for the pumps 207 and 208 operates from the difference in intake and discharge pressures at the apparatus included in body 114, for the upper end of piston valve 219 is subjected to the discharge pressure of the apparatus existing in line 204 and the lower end of the piston valve is subjected to the intake pressure of the apparatus existing in line 155 as communicated by line 242. Restriction 243 removes the effect of variations of intake fuel pressure of short duration and also dampens oscillations of piston valve 219 from other causes. Spring 239, acting on the upper end of the piston valve 223 assures that the piston valve assume a certain position along the length of the valve sleeve 221 for a given difference in intake and outlet fuel pressures as transmitted to the ends of the piston valve.

A return line 244 leads from the line 216 to the conduit 159 on the intake side of the transfer pump 35. Communication between the lines 216 and 244 is regulated by a piston valve 245 under the control of a speed governor 246 responsive to turbine speed. A relief line 246a containing a relief valve 247 connects the intake and discharge sides of the transfer pump 35. A line 248 leads from the line 244 to the valve 217. During normal operation the valve 217 passes fuel from the line 216 to the fuel divider 218. The valve is so constructed that when appropriately regulated, it connects the flow divider with the line 249 for draining the former and lines 216 and 248 for passing the entire flow of fuel to the discharge side of the transfer pump 35.

In operation of the above described apparatus, fuel is drawn from the fuel tank 33 through the booster pump 34 through conduits 158 and 159, the transfer pump 35, and the conduit 155 to the body 114, through which it passes to the annular recess 154 and thence through the orifice 153 and annular recesses 151 and 152 in the outer fixed sleeve valve 150 and past the upper edge of the movable inner sleeve valve 149 to the portion of the unmetered-fuel chamber 144 below the diaphragm 141. From there the fuel moves to the metered-fuel chamber 143 to the left of wall 162 by way of the orifice 161, the size of which is regulated through appropriate adjustment of indicator 164 selectively set in accordance with desired temperature of products of combustion going from the burners to the gas turbine. The pressure of the fuel is reduced in accordance with the amount of restriction provided at orifice 161 by the needle valve 163, which adjusts the orifice. Since the unmetered-fuel pressure is greater than the metered-fuel pressure, the diaphragm 141 will be urged upwardly with a force dependent upon th difference between these two fuel pressures, which difference is in turn dependent upon the square of the flow of fuel past the orifice 161 and 161a. The upward net force through fuel-pressure difference acting upon the diaphragm 141 is communicated to the rod 125. This upward force on the rod is opposed by a downward force on the rod dependent upon the difference in air pressures acting upon the upper and lower sides of the diaphragm 122 in the air chambers 117 and 121, which is the air-pressure difference transmitted by sensing elements 115 and 118 modified by the temperature-responsive device 41. When the flow of fuel is proper for the flow of air, the air-pressure difference acting downwardly upon the diaphragm 122 is effectively balanced by the fuel-pressure difference acting upwardly on the diaphragm 141. Thus the valve 149 holds its position, and there is no change in the size of the regulating orifice 150ª formed by the valves 149 and 150. Let it be assumed, for the moment, that the valve 192 is open. If the flow of air to the burners changes in rate, this change will be sensed by the elements 115 and 118, and a changed difference in pressure will be transmitted to the diaphragm 122. If the rate of air flow increases, there will be a greater air-pressure difference acting downwardly upon the diaphragm 122, and for the moment the upward fuel-pressure difference acting upon the diaphragm 141 will be effectively less than the air pressure differences acting upon the diaphragm 122. As a result, the rods 125 and 146 will move downwards causing the upper end of the movable sleeve valve 149 to provide less of a restriction to the recesses and passages in the outer fixed valve 150. Thus there is an increase in the size of the regulating orifice, and consequently, the flow of fuel increases. Since the fuel flow increases, the drop in pressure across the orifice 161 increases, and thus there is provided a greater fuel pressure difference acting upwards upon the diaphragm 141. When the increase in fuel-pressure difference effectively matches the increase in air-pressure difference, downward movement of the valve rods 125 and 146 and of the inner sleeve valve 149 ceases. Thus a new fuel flow has been established, which is appropriate to the new increased air flow. If the air flow decreases, the opposite of the above described takes place. The effective force of the fuel-pressure difference acting upwardly upon the diaphragm 141 is greater than the effective force of the air-pressure difference acting downwardly upon the diaphragm 122, and therefore, the rods 125 and 146 and the inner sleeve valve 149 move upwardly. This action decreases the size of the regulating orifice 150ª formed by the valve parts 149 and 150, and the fuel flow decreases. Thus the fuel-pressure drop across the orifice 161 is decreased, and a lower upward pressure acts against the diaphragm 141. Thus balance is restored between the air-pressure difference acting on the diaphragm 122 and the fuel-pressure difference acting on the diaphragm 141.

During the above described changes it has been presumed that the valve 192 was open, and this was the case if the turbine was not in the desired speed range, so that the solenoid was electrically energized to bring the core 197 to its lower position. Let it now be assumed that the turbine is operating in the desired speed range. Now the solenoid 196 is no longer energized, and the plunger 197 brings the valve 192 to closed position under the influence of the fuel pressure acting upwards against the diaphragm 195. Now fuel in the chamber 179 cannot escape by way of the line 182, chambers 183 and 189, orifice 191, chamber 193 and the line 194, and the only outlet from the chamber 179 is through the passage 180, but this passage has the restriction 181, which provides a time delay to such escape. Thus the volume of fluid in the chamber 179 cannot change suddenly, and the diaphragm 126 cannot shift its position suddenly. Consequently, the rods 125 and 146 and the inner sleeve valve 149 cannot immediately move upwardly or downwardly in response to changes in air flow as transmitted as a pressure difference to the diaphragm 122. The rods and valve 149 can move only if there is sufficient time for fuel to flow through the restricted orifice 181 into or out of the fuel chamber 179. Thus changes in air flow of a short duration have no effect upon the fuel flow, for temporarily the inner sleeve valve 149 remains in its original position, and there is no change in the size of the regulating orifice. Keeping the fuel apparatus from being sensitive to air-flow changes of a short duration prevents unstable operation of the apparatus, which may easily occur if the controls are made sensitive to changes of a short duration in the use of the apparatus with the power plant shown in Fig. 1.

If the air flow decreases sufficiently, the rod 125 will be urged upwardly with sufficient force to cause the compression of the trapped fuel in the chamber 179 to act against the diaphragm 184 sufficiently to lift it and thereby to provide the appropriate increase in space for the trapped fuel to permit the upward movement of the rods 125 and 146 and the inner sleeve valve 149 for reduction of the regulating orifice. Lifting of the diaphragm 184 takes place when the pressure in the chamber 179 has through compression risen from metered-fuel pressure up to or just above the unmetered-fuel pressure existing above the diaphragm 184. Thus for a large reduction in air flow there will be immediately provided an appropriate reduction of fuel flow as a precaution against over-heating of the turbine due to too high a temporary rate of fuel-flow rate to air-flow rate. The fuel flow will not immediately be reduced completely to the point where the ratio of fuel to air flow is the predetermined value, because this ratio can be obtained only when the pressure in the chamber 179 is the same as that in chamber 117, and this pressure will be equal only when sufficient fuel has escaped from the chamber 179, and this requires time. The error represented by the difference between the fuel flow actually existing under this condition and the theoretically correct fuel flow for the actual air flow will be always approximately the same percentage of the fuel flow, since the diaphragm 184 is subjected to the difference between metered- and unmetered-fuel pressure, which is a measure of fuel flow. A large increase in air flow will not immediately have the same effect, because the resultant increase in downward thrust upon the air diaphragm 122 will only tend to increase the volume of fuel trapped against immediate release from the space 179 and associated parts. This will tend to move the diaphragm 184 downwards to achieve compensation by reduction of the size of the chamber 183, but the projection 185, attached to the diaphragm prevents downward movement of the diaphragm.

Under starting conditions, it may be desirable to use a minimum rate of fuel flow higher than is possible when the idle spring 201 is raised to the position of Figs. 2 and 3 by the rod 202ª. In this event, the arm 202ᵈ is shifted counterclockwise to make the valve 200 open the passage 199. The arm 202ᵈ acts through the link 202ᵍ to lower the horizontal arm of the bell-crank 202ʰ. Now the aforesaid horizontal arm provides no opposition to movement of the rod 202ª, and the spring 201 moves against the stop 202ᵇ. Now air-flow rate exerts no fuel control, since the passage 199 equalizes the pressures at opposite sides of the diaphragm 122. The fuel-flow rate is higher than the possible minimum obtainable in the relative position of parts of Figs. 2 and 3.

It has previously been assumed that the temperature of air flowing to the burners has not changed, and therefore, that the temperature-responsive element 41 has not acted through various described control means to adjust its valve 45 with respect to the valve opening 44. If now the temperature of air going to the burners increases, the valve 45 is moved downwards by the bellows 46, reducing the restriction of the valve opening 44. This means a greater difference between the air-pressure difference sensed by elements 115 and 118 and the pressure difference transmitted to the diaphragm 121. Thus as the temperature of air flowing to the burners increases, the apparent air-flow rate in the form of pressure difference on diaphragm 122 decreases, although the actual air-flow rate may remain constant, as sensed by the elements 115 and 118. Since the air-pressure difference acting on the diaphragm 122 is decreased, and the fuel-pressure difference acting on diaphragm 141 is presumed to remain constant for the moment, the unbalance will move the inner valve 149 up, reducing the size of the regulating orifice 150ª to produce a lower fuel-flow rate that will just balance the apparently reduced air-flow rate. Decrease in the temperature of air flowing to the burners has the opposite effect. In this case, the bellows 46 contracts, moving the valve 45 toward the valve opening 44 to increase the restriction of the latter. This will reduce the difference between air-pressure difference sensed by elements 115 and 118 and air-pressure difference acting on diaphragm 122. If the actual air-flow rate remains constant as may be assumed, the apparent air-flow rate or the air-pressure difference acting on diaphragm 122 increases, causing the valve 149 to be moved downwards and the size of the regulating orifice 150ª to be increased. This produces an increased fuel flow, increasing the pressure drop across the orifice 161 to restore balance between the fuel-pressure forces acting against the diaphragm 141 and air-pressure forces acting on diaphragm 122. Thus the air-flow rate has remained the same, while the fuel flow rate has increased, and so there has been provided an increase in the ratio of fuel flow to air flow. Thus there is provided a compensation for the decrease in the temperature of air flowing to the burner in maintenance of a constant temperature of products of combustion flowing from the burners to the turbine.

If a greater temperature is desired for the products of combustion passing from the burners to the turbine, indicator 164 is moved to a clockwise direction thereby moving the needle valve 163 to the left and increasing the effective size of the orifice 161. Thus, for the moment, the pressure drop across the orifice is reduced, for the flow of fuel remains constant, and the fuel-pressure difference acting upwardly against the diaphragm 141 is reduced. Thus the balance between the air-pressure forces and the fuel pressure forces is disturbed, and thus sleeve valve 149 moves downwardly increasing the regulating orifice formed between the valves 149 and 150. This increases the fuel flow and the pressure drop across the orifice 161. Thus balance is restored between the diaphragms 122 and 141. The air-flow rate has remained the same, and the fuel flow rate has increased. Thus there is an increase in the ratio of fuel flow to air flow, and since the temperature of air flowing to the burners has been assumed to remain constant, the increase in ratio of fuel to air must result in a greater temperature of products of combustion produced by the burner. Similarly the temperature of products of combustion may be reduced by greater restriction of the orifice 161 by the needle valve 163.

After the fuel passes through the metering orifice 161, it goes through the conduit 204 to the pumps 207 and 208. If the pump 207 is functioning properly, the entire output of the pump 208 will be bypassed, with the parts in the position shown in Fig. 2, through the openings 237, the space between the piston valve sections 225 and 226, the sleeve openings 228, and the return line 229 back to the intake side of the pump 208. A portion of the output of the pump 207 will be bypassed through the line 215, the sleeve openings 227, the space between the piston valve sections 225 and 226, the valve sleeve openings 228, and the return line 229 to the intake side of either pump 208 or pump 207. The portion of the pump 207 that is not bypassed as aforesaid, is delivered through the line 216 and the valve 217 to the flow divider 218, whence it proceeds to the individual burners. The position of the valve 223 will determine the relative portions of the output of the pump 207 that are bypassed through the line 215 and delivered to the burners through the line 216. The position of the valve 223 is determined by the pressure of fuel above the valve piston section 225, which is determined by the difference between the pressure existing in the line 204 leading to the pumps 207 and 218 and the pressure in line 242, with the aid of a coil acting against the valve piston section 225. The force exerted by spring 239 is substantially constant in all positions and is adapted to balance a difference in pressure normally always existing between line 242 and line 204. If it be assumed that the pressure in line 242 is constant (and this is generally the case), then the greater the pressure in the line 204, the lower the position of the valve 223, the more the piston valve section 225 covers the ports 227, the less the amount of output by the pump 207 bypassed through the line 215 and the sleeve valve openings 227, and the greater the amount of the output of the pump 207 going through the line 216 to the flow divider 218 and to the openings. Thus there is a tendency to maintain the constant pressure in the line 204 or on the intake side of the pumps 207 and 208, for the greater this pressure becomes, the greater the relative amount of the pump output delivered to the burners. If pump 207 fails, presumably the output pressure of the pump falls very low, and the fuel pressure on the intake side reaches a high level. Consequently, two things happen: pump 208 delivers fuel through line 234, check valve 236, and lines 213, 214, and 216 to the flow divider 218; and the piston valve 223 is depressed under the increased fuel pressure in the line 204 until the sleeve valve openings 227 are completely closed, and the sleeve valve openings 237 are at least partially closed, thereby reducing the amount of fuel bypassed from pump 208 by way of line 235 and return line 229. If pump 207 again functions properly, pressure in the line 204 will be sufficiently lowered as a result of fuel delivered by pumps 207 and 208 to cause the piston valve 223 to rise until the output of pump 208 is bypassed by virtue of complete uncovering of the valve openings 237, and a portion of the output of pump 207 may be bypassed by a partial uncovering of the valve openings 227.

Figure 4:
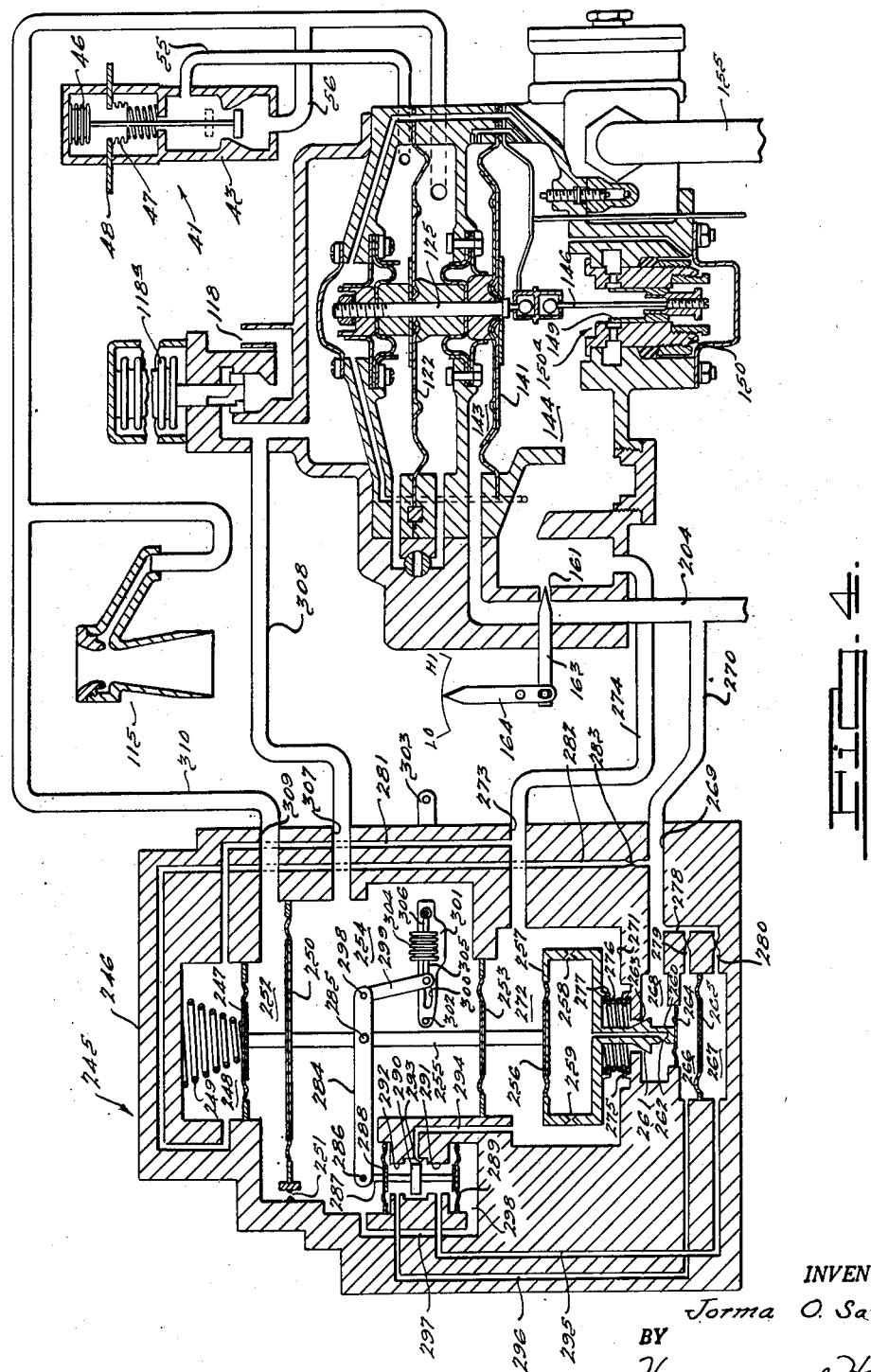
Figs. 4 and 5 show other forms of controls of the present invention applied to a fuel-and-air-metering device.

The apparatus of Fig. 4 is similar to that of Fig. 2, except that there is a device 245 that operates temporarily to increase or decrease the fuel-flow signal in accordance with a temporary increase or decrease in the air-flow signal, to make the fuel-flow rate constant in spite of changes in air-flow rate of short duration. The apparatus of Fig. 4 includes the velocity pressure element 115 and the impact pressure element 118 transmitting air pressures to the lower and upper sides of the air diaphragm 122. The temperature-responsive device 41 acts through the lines 55 and 56 to modify the air-pressure difference from the sensing elements 115 and 118 transmitted to the air diaphragm 122 so that compensation is obtained for variation in temperature of air flowing through the conduit means 19 to the burners 13. The fuel diaphragm 141 is subjected on the one side to metered-fuel pressure existing in the chamber 143 and unmetered-fuel pressure existing in the chamber 144, there being a difference between these pressures because of the orifice 161 controlled by the needle valve 163 through an indicator 164 positioned in accordance with desired temperature of combustion products issuing from the burners 13. The air and fuel diaphragms 122 and 141 act through rods 125 and 146 to adjust the inner valve part 149 forming with the outer valve part 150 the regulating orifice 150$^a$. Thus the regulating orifice 150$^a$ is adjusted to maintain a predetermined ratio of fuel-flow rate to air-flow rate, which ratio may be varied by the temperature-responsive device 41 to maintain a predetermined temperature of combustion products issuing from the burners to the turbine.

The device 245 has a body 246 in which is formed a plurality of passages to be described presently. Mounted in the body 246 is a diaphragm 247, which with the body 246 forms a chamber 248. A variable-rate or non-linear spring 249 acts against the diaphragm 247 to move it downwardly, as viewed in Fig. 4. A diaphragm 250 is mounted in the body 246 and has a restricted opening 251. The diaphragms 247 and 250 together with the body 246 form a chamber 252. A diaphragm 253 is mounted in the body 246. The diaphragms 250 and 253 form with the body 246 a chamber 254. A rod 255 is connected to the diaphragms 247, 250, and 253 and to a diaphragm 256 forming part of one wall of a container 257 having restricted openings 258 and 259. The container 257 includes a stem part 260 which has a valve portion 261 and a restricted passage 262. The valve portion 261 is engageable with a seat 263 formed in the body 240. The stem 260 is attached to a small diaphragm 264 and a large diaphragm 265 mounted in the body 246 and forming therewith chambers 266 and 267. When the valve 261 closes the opening 263, there is formed a chamber 268 with the aid of the housing 246 and the diaphragm 264. Communication is established between the chamber 268 and the discharge line 204 by a passage 269 in the body 246 and a line 270. Between the diaphragm 253 and an interior wall 271 in which the opening 263 is formed, there is formed a chamber 272. Communication is established between the chamber 272 and the unmetered-fuel chamber 144 through a passage 273 in the body 246 and a line 274. Since the metered-fuel chamber 143 is in direct communication with the discharge line 204, which communicates with the chamber 268 in the body 246 through the passage 269 and the line 270, the chamber 268 is at metered-fuel pressure. Since the chamber 272 communicates with the unmetered-fuel chamber 144, the chamber 272 is at unmetered-fuel pressure. The drop in pressure across the valve opening 263 in the body 246 is equal to the difference between unmetered- and metered-fuel pressures in the chambers 144 and 143, which is a drop in pressure across the metering orifice 161.

The wall 271 in the body 246 carries a flange 275, which engages one end of a coil spring 276. The other end of the spring is engaged by a flange 277 formed on the container 257. A passage 278 and a restricted passage 279 connect the chamber 266 with passage 269, and the passage 278 and a restricted passage 280 connect the chamber 267 with the passage 269. A passage 281 in the body 246 connects the passage 273 with the chamber 248 and thereby places this chamber at unmetered-fuel pressure. The chamber 248 is connected to the passage 269 by a passage 282 having a restriction 283.

A lever 284 in the chamber 254 is pivoted on the rod 255 at an intermediate point, as indicated at 285. One end of the lever 284 is pivotally connected as at 286 to a rod 287 attached to diaphragms 288 and 289. The rod 287 carries a piston 290 which fits spaced aligned bores 291 and 292. A portion 293 between these bores is of larger diameter. A passage 294 connects the chamber 272 and the portion 293. A passage 295 connects the bore 291 and the chamber 266. A passage 296 connects the bore 292 and the chamber 267. A passage 297 connects the chamber 254 and a chamber 298 beyond the diaphragm 289. At the end of the lever 284 opposite the end to which the rod 287 is connected, there is pivotally connected, as indicated at 298, one end of a link 299. The other end of the link 299 is connected to an arcuate slot 300 formed in a member 301 pivoted on a shaft 302. The shaft 302 projects from the body 245, and a control stick 303 is secured to an external portion of the shaft 302 in a manner not shown. The position of the one end of the link 299 in the slot 300 in the member 301 is controlled by aneroid bellows 304, which is connected at one end by a part 305 with the link 299 and at the other end to a part 306 with the member 301. The sensing element 118 is connected with the chamber 254 in the body 246 by a passage 307 in the body 246 and a line 308, and thus the chamber 254 is subjected to the air pressure sensed by the element 118. The chamber 252 is connected with the sensing element 115 by a passage 309 in the body 246 and a line 310, and thus the chamber 252 is subjected to the air pressure sensed by the element 115.

As previously mentioned, the air and fuel diaphragms 122 and 141 control the inner movable valve part 149 of the regulating orifice 150$^a$ to adjust the fuel-flow rate in accordance with air-flow rate in order to maintain a predetermined ratio of air-flow rate to fuel-flow rate. This ratio is modified by the temperature-responsive device 41 in inverse relation to the temperature of air going to the burners in order to maintain a predetermined temperature of combustion products issuing from the burners. If it is desired that the temperature of the combustion products be changed, then the needle valve 163 is adjusted.

Let us now consider the effect on the fuel-flow rate of changes in air-flow rate of short duration. Assume, for example, that the air-flow rate increases. This means a greater difference between pressure sensed by the elements 115 and 118 and a greater downward force on the air diaphragm 122 tending to increase the size of the regulating orifice 150$^a$. The aforementioned increase in pressure difference sensed by the elements 115 and 118 acts against the diaphragm 250 in the body 246, so as to move the diaphragm, the rod 255, and the diaphragm 256 upwards. The container 257 will also be moved upwards, since the volume of the container is temporarily fixed, because the container has only restricted openings 258, 259, and 262. The valve 261 attached to the container 257 is moved upwards, increasing the pressure drop across the opening 263. Since the chambers 272 and 268 at opposite sides of the valve opening 263 are directly connected with the chambers 144 and 143 at opposite sides of the fuel diaphragm 141, the difference in pressure between the chambers 144 and 143 is increased, and thereby a greater upward force is exerted on the fuel diaphragm 141. This greater upward force on the fuel diaphragm balances the aforementioned greater downward force on the air diaphragm due to increased air flow. Thus there is no immediate adjustment of the regulating orifice 150$^a$, and consequently, no increase in fuel-flow rate. If the change in air-flow rate is only of short duration, the force acting on the air diaphragm 122 will return to its original value, and the force on the diaphragm 250 in the body 245 will also return to its original value bringing the valve 261 to its original position accompanied by the original pressure drop across the opening 263, and the fuel-flow rate will continue without change. However, if the change in air-flow rate has more than a short duration, the restricted openings 258, 259, and 262 in the container 257 have time to allow sufficient fluid to enter the container 257 to enable the container to return to its original position under the influence of the coil spring 276 bringing about the original position of the valve 261 and the restriction of the opening 263, in spite of the fact that the diaphragm 256 forming part of the container 257 has moved upwards because of the increased upward force acting on the diaphragm 250 due to increase in air-flow rate. Since with the passage of time the restriction of the opening 263 has returned to its original value, the pressure drop across the opening 263 or the difference between the pressures in the unmetered- and metered-fuel chambers 144 and 143 is decreased to its original value. This means that the increased downward force on the air diaphragm 122 due to increased air-flow rate may now move the inner valve part 149 downwards to increase the size of the regulating orifice 150$^a$. Thus the fuel-flow rate is increased in accordance with air-flow rate in maintenance of a predetermined ratio of fuel-flow rate to air-flow rate.

If the air-flow rate decreases for a short time, the opposite of the aforedescribed takes place. Decrease in air-flow rate means decrease in air pressures sensed by the elements 115 and 118 and a decrease in the downward force acting on the air diaphragm 122. This should otherwise cause the inner valve part 149 to rise to decrease the size of the regulating orifice 150$^a$, but in the meantime, the upward force on the diaphragm 250 has decreased because of decrease in air-flow rate. Because of the spring 249 acting against the diaphragm 247 and in turn against the rod 255, the decrease in upward force on the diaphragm 250 results in a downward movement of the rod 255 and the diaphragm 256. Because the openings 258, 259, and 262 in the container 257 are restricted, downward movement of the diaphragm 256 first brings about downward movement of the container 257 and its associated valve portion 261 against the action of the coil spring 276. Downward movement of the valve 261 decreases the restriction of the opening 263, thereby lowering the pressure drop across the opening 263 between the chambers 272 and 268 and the chambers 144 and 143. This means that the fuel in the chambers 144 and 143 exert a smaller upward force on the fuel diaphragm 141, which force just balances the smaller downward force acting on the air diaphragm 122 due to decreased air-flow rate. If the air-flow rate increases to its previous value after just a short time the downward force on the air diaphragm 122 will increase to its original value, and at the same time the upward force on the diaphragm 250 will likewise increase causing the valve 261 to be returned to its original position. This increases the pressure drop across the opening 263 or the difference in pressure between the fuel chambers 144 and 143, and thus there is an increase to original value of the upward force acting on the fuel diaphragm 141, which balances the increase to original value of the downward force on air diaphragm 122. Thus the inner valve part 149 does not move, and the size of the regulating orifice 150$^a$ is maintained. If the aforementioned decrease in air-flow rate continues, the restricted openings 258, 259, and 262 in the container 257 have time to allow the expulsion of fluid from the container 257, and the container and the valve 261 move upwards to their original position under the action of the spring 276, in spite of the fact that the diaphragm 250 and the rod 255 have caused the diaphragm 256 to assume the lower position. With the valve 261 returned to its original position, the restriction of the opening 263 has been increased causing a greater difference in fuel pressures in the chambers 143 and 144 and a greater upward force, or a return to the original value of upward force, acting on the fuel diaphragm 141. Since the decrease in air-flow rate has produced a decrease in downward force acting on the air diaphragm 122, the inner valve part 149 moves upwards to decrease the size of the regulating orifice 150$^a$, and the fuel-flow rate is decreased in accordance with the air-flow rate.

Let us now consider the operation of the control stick 303 and its associated parts. If the right end of the stick is moved upwards from the position shown in Fig. 4, this motion will be transmitted through the shaft 302, the member 301, and the link 299 to the right end of the lever 284, causing it to move upwards about the connection 285 of the lever with the rod 255 as a pivot. Accordingly, the left end of the lever 284 moves downwards, bringing the piston 290 into the bore 291 or into restricting relation with respect to the end of the bore 291. Thus connection between the chamber 272 and the chamber 267 is broken or restricted by way of the passages 294 and 295, and the chamber 267 is placed at the metered-fuel pressure existing in the chamber 268, by virtue of the connection between the chambers through the passages 269, 278, and 280. Since the chamber 267 was previously at unmmetered-fuel pressure, the pressure in the chamber has been decreased, and accordingly, the unmetered-fuel pressure in the chamber 266 causes the diaphragm 265 to move downwards, carrying with it the stem portion 260 of the container 257 and the valve 261. The valve 261 by moving downwards decreases the restriction of the opening 263 and also the pressure drop across the opening 263 or the pressure difference between chambers 272 and 268 or chambers 144 and 143 and an upward force acting on the fuel diaphragm 141. Since the downward force acting on the air diaphragm 122 remains constant because of a presumed constant air-flow rate, the downward force on the air diaphragm is now larger than the upward force on the fuel diaphragm 141, and the inner valve part 149 is moved downwards to increase the size of the regulating orifice 150ª. Thus the fuel-flow rate is increased, and likewise the ratio of fuel-flow rate to air-flow rate. If the right end of the control stick 303 is moved downwards, there will result an upward movement of the piston valve 290 into a position in the bore 291, in which connection of the chamber 266 with the unmetered-fuel chamber 272 by way of the passages 294 and 296 is cut off. Now the pressure in the chamber 266 is decreased to the value of unmetered-fuel pressure existing in the chamber 268, because of the connection of the chambers 266 and 268 through the passages 269, 278, and 279. This decrease in the pressure in the chamber 266 means a decrease in the net downward force acting on the stem 260 through the small and large diaphragms 264 and 265, and the valve 261 is moved upwards, increasing the restriction of the opening 263. This brings about an increase in pressure drop across the opening 263 and in pressure difference between chambers 272 and 268 or chambers 144 and 143 and an increase in upward force acting on the fuel diaphragm 141. Since the downward force on the air diaphragm 122 remains constant because of a presumed constant air-flow rate, the increase in upward force on the fuel diaphragm will move the inner valve part 149 upward, reducing the size of the regulating orifice 150ª. The result is a decrease in fuel-flow rate and a lower ratio of fuel-flow rate to air-flow rate. When, as aforesaid, the piston valve 290 moves down into the bore 291, the pivot point 285 of the lever 284 on the rod 255 will also move downwards somewhat for a short time, because the resultant decrease in fuel pressure in the chamber 267 causes the container 257 with its restricted openings 268, 259, and 262 to move the diaphragm 256 and the rod 255 downwards. This downward movement of the pivot point 285 of the lever 284 is only temporary, because with time sufficient fluid may enter the container 258 by way of the restricted passages 258, 259, and 262 to permit the diaphragm 256 forming one wall of the container 257 to move upwards under the influence of the air forces acting on the diaphragm 250. Thereby the pivot 285 is returned to its original position. The same general thing takes place when the piston valve 290 moves up into the bore 292 to cut off communication between the chambers 266 and 272, thereby placing the chamber 266 at the pressure of the chamber 268. Decrease in pressure of the chamber 266 moves the container 257 upwards, causing the diaphragm 256 to move the rod 255 and the pivot point 285 of the lever 284 on the rod 255 upwards. The pivot point 285 returns downwards to its original position as soon as the restricted openings 258, 259, and 262 in the container 257 can permit the expulsion of sufficient fuel from the container 257 to allow the air forces on the diaphragm 250 to return the rod 255 and the pivot point 285 of the lever 284 on the rod 255 to the original position.

To summarize the aforesaid, downward movement of the right end of the control stick 303 may be used to decrease the fuel-air ratio, and upward movement of the control stick, to increase the aforesaid ratio. The control stick 303 may be connected with the propeller-pitch governor 27 (Fig. 1) in such a way that if the speed of the propeller 10 is to be increased, the right end of the control stick 303 is moved upwards, increasing the fuel-air ratio. The result is an increase in the temperature of combustion products flowing from the burners 13 to the gas turbine 14 and an increase in the speed of the turbine. Increase in turbine speed produces an increase in speed of the compressor 11, and the air-flow rate is proportionally increased, because of the characteristics of the compressor and the gas turbine. The increase in air-flow rate resulting from the increased fuel-air ratio will eventually move the diaphragm 250 upwards sufficiently to balance the upward movement of the right end of the lever 284 due to upward movement of the control stick 303 in the attempt to produce a greater speed, and thereby the piston valve 290 will be returned to its intermediate position of Fig. 4, in which it blocks neither the passage 295 nor the passage 296, and the valve 261 under the influence of the coil spring 276 is returned to its original position, thereby restoring the original pressure drop across the orifice 263 for a given fuel-flow rate, and accordingly bringing about a return to the original ratio of air-flow rate to fuel-flow rate. The same general thing will take place when the right end of the control stick 303 is moved downwards to raise the piston 290 to restrict the passage 296, thereby reducing the fuel-air ratio. The reduction in pressure in the chamber 266 raises the container 257 causing the diaphragm 256 to raise the rod 255 and the pivot 285 for the lever 284 on the rod. Thus the piston valve 290 is raised farther into blocking position in the bore 292. After a short time sufficient fuel will have escaped through the openings 258, 259, and 262 in the container 257 to allow the diaphragm 256, the rod 255, and the pivot point 285 for the lever 284 on the rod to return to the original position under the influence of the air forces acting on the diaphragm 250 and the conical spring 249. The lower fuel-air ratio reduces the temperature of combustion products going to the turbine 14 and accordingly the speed of the compressor and gas turbine is reduced. The characteristics of the compressor and gas turbine are such that reduction in speed thereof brings about a corresponding reduction in air-flow rate. This is translated in a reduction in the air pressure difference acting upwards on the diaphragm 250, and the conical spring 249 moves the rod 255 and the pivot point 285 for the lever 284 thereon downwards sufficient to compensate for the downward movement of the right end of the lever 284 until the left end of the lever 284 is returned to its original position, bringing the piston 290 to the mid position shown in Fig. 4 between the bores 291 and 292. The removal of the piston valve 290 from the bore 292 re-establishes communication between the unmetered-fuel chamber 272 and the chamber 266 by way of the lines 294 and 296. Thus the pressure in the chamber 266 rises from that of metered fuel to that of unmetered fuel. Accordingly, the valve 261 is lowered to its original position, and the original pressure drop across the opening 263 for a given fuel-flow rate is restored. This means restoration of the original ratio of fuel-flow rate to air-flow rate. As the air pressure decreases, for example, with increase in altitude, the aneroid bellows 304 associated with the control stick 303 expands, moving the end of the link connected with the member 301 in the arcuate slot 300 nearer the pivot shaft 302 for the control stick 303 and the member 301. Thus for a given angular movement of the control stick 303, the lower the air pressure, the less the movement of the right end of the lever 284. Similarly, the movement of the left end of the lever 284 is reduced. Since the impact-pressure-sensing element 118 carries an altitude-correcting capsule 118a, the pressure difference acting on the diaphragm 250 is dependent upon the weight of air flowing per unit of time, rather than on the volume of air flowing. The compressor 11 and the gas turbine 14 are characterized by an air-flow rate proportional to speed, as aforesaid, but this air-flow rate is in volume per unit of time rather in weight per unit of time. Consequently, when a new propeller speed is desired and is selected by adjustment of the propeller pitch governor 27, the new position of the diaphragm 250 should be responsive to a volume air-flow rate for the new speed, rather than a weight rate. However, since the diaphragm is responsive to changes in weight air-flow rate because of the correcting capsule 118a, there must be a separate correction applied and this is obtained through adjustment of the distance between the connection of the link 299 with the member 301 and its pivot shaft 302.

A conical spring 249 has been selected to oppose motion of the air diaphragm 250 in the device 245, because the variable rate of the spring provides compensation or the fact that the air pressure difference acting upwards on the diaphragm 250 in an attempt to compress the spring 249 is proportional to the square of the air flow rather than to the first power thereof.

The fuel delivered by the apparatus in Fig. 4 through the line 204 may go through a two-pump control such as that shown in Fig. 2 and then go to the burners 13, where it and air coming to the burners by way of a conduit means 19 are transformed to combustion products driving the gas turbine 14.

Figure 5:
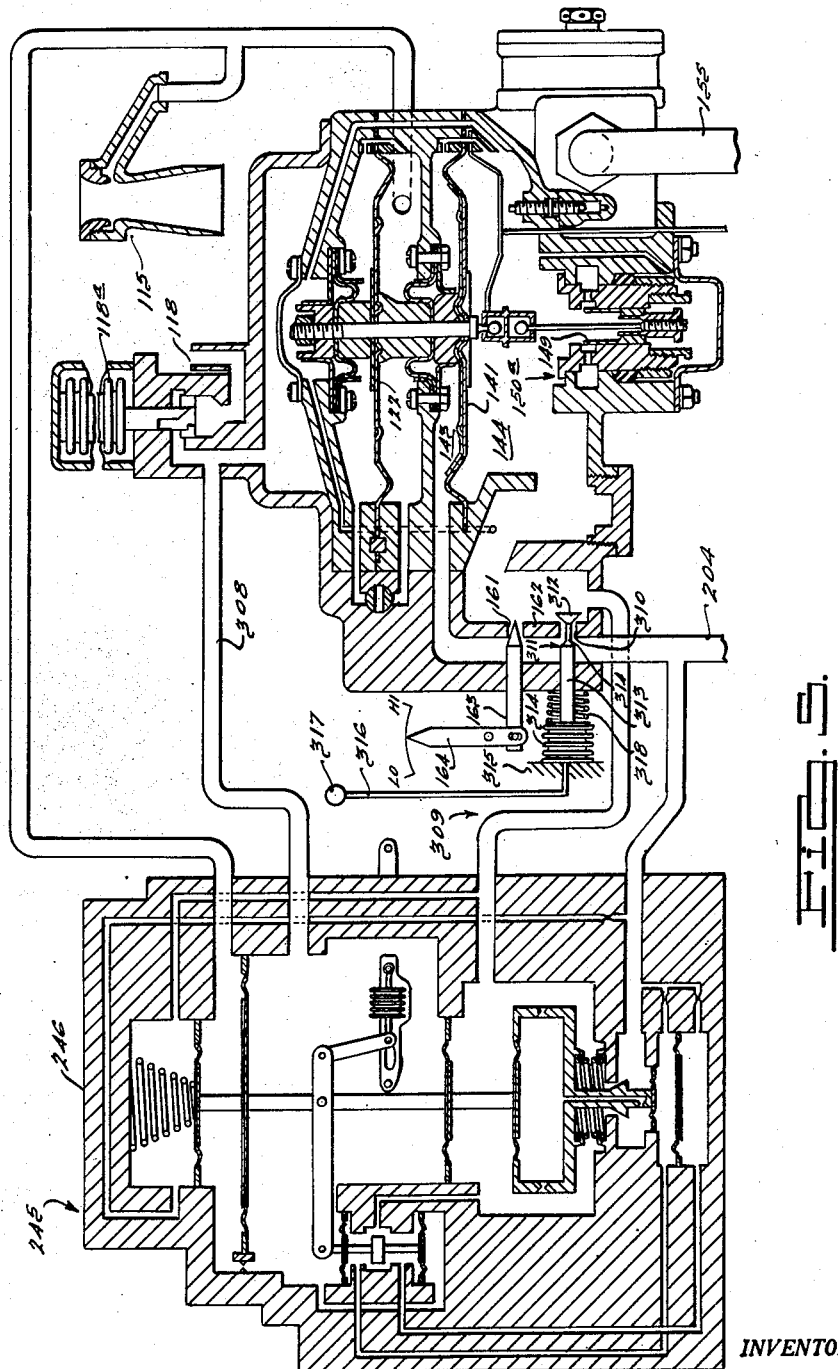

The apparatus of Fig. 5 differs from that of Fig. 4 in that a temperature-responsive device 309 acting to meter the fuel is substituted for the temperature-responsive device 41, which acts to modify air pressure signals transmitted to the air diaphragm. In Fig. 5 the wall 162 of the fuel-metering body is provided with an orifice 310, which is controlled by a valve 311, comprising an enlarged head 312 at one side of the wall 162, a thick stem 313 presenting a shoulder at the other side of the wall 162 and a thin stem 314 connecting the head 312 and the thick stem 313. The stem 313 is connected to a bellows 314 acting against a fixed stop 315. A line 316 connects the bellows 314 and a temperature-responsive element 317, which is adapted to be positioned in the conduit means 19 so as to be subjected to temperature of air flowing from the regenerator 12 to the burners 13. A liquid expanding with temperature is placed in the bellows 314, the line 316, and the element 317. A coil spring 318 acts between the fuel-metering body and the bellows 314 tending to collapse the bellows and serving to insure that in event of escape of liquid from the bellows 314, the line 316, or the element 317, the bellows will further collapse and the enlarged valve head 312 will be moved to the left closing the metering orifice 310. In normal operation of the temperature-responsive device 309 the shoulder on the thick stem 313 will move toward or away from the orifice 310 as the temperature of air flowing to the burners, sensed by the element 317 rises and falls. If the temperature of air sensed by the element 317 increases, the valve stem shoulder moves toward the orifice 310, increasing the restriction upon the orifice 310 and the pressure drop across it. Thus there is a greater difference in fuel pressure in the chambers 144 and 143 and an increased upward force acting on the diaphragm 141. Since the force acting on air diaphragm 122 remains constant due to a presumably constant air-flow rate, the upward force on fuel diaphragm 141 is greater than the downward force on the air diaphragm 122 and the inner valve part 149 is raised to reduce the size of the regulating orifice 150. Thereupon the fuel-flow rate is reduced to the point where the original lower pressure drop is obtained across the orifice 310. This restores the upward force on the fuel diaphragm to its original value, and the valve part 149 stops its upward movement. Thus there is obtained a lower ratio of fuel-flow rate to air-flow rate, which lower ratio compensates for the increase in temperature or air flowing to the burners, and the predetermined temperature of combustion products flowing from the burners to the turbine is maintained.

If the temperature of air flowing to the burners sensed by the element 317, is decreased, the valve 311 moves to the left, causing the restriction of the orifice 310 to be reduced by movement of the shoulder on the thick stem 313 to the left away from the orifice 310. Thus the pressure drop across the orifice 310 is decreased, and the upward force on the fuel diaphragm 141 is decreased. Now the downward force on the air diaphragm 122 due to a presumably constant air-flow rate is greater than the upward force on the fuel diaphragm 141, and the inner valve part 149 is moved downwards, increasing the size of the regulating orifice 150a. Thereby the fuel-flow rate and the ratio of fuel-flow rate to air-flow rate are increased. If there is failure in the bellows 314, line 316, or temperature-responsive element 317 resulting in escape of liquid from these parts, the spring 318 moves the bellows 314 to the left, causing the valve head 312 to be moved to the left to close opening 310. This increases the pressure difference between chambers 143 and 144 causing the inner valve part 149 to be moved up to decrease the size of the regulating orifice 150a and the fuel-air ratio. The result is a cool safe running of the turbine 14. It does not matter that the temperature of air flowing to the burners 13 may increase, for the closing of the orifice 310 reduces the fuel-air ratio so as to make the turbine safe for any temperature of air flowing to the burners. In the apparatus of Fig. 5, fuel is received from any appropriate source through the conduit 155, which source is not shown, but may be the various parts connected to the conduit 155 in Fig. 2. Fuel is discharged through the conduit 204 and may go to the burners by way of a two-pump control such as that shown in Fig. 2.

I claim:

1. In combination, a burner, means forming a path for the flow of air to the burner, means forming a path for the flow of fuel to the burner, a pressure movable diaphragm, means connected for movement with the diaphragm to control the flow of fuel in said fuel path, said diaphragm being subjected on opposite sides to first and second pressures of air in the air path having a difference indicative of air flow rate, said first air pressure exceeding said second air pressure by the amount of said difference and having a communication through which said first air pressure is communicated to the diaphragm, a bellows responsive to density of the air in the air path for variably restricting said communication and being adapted to change the restriction toward its open position under condition of increasing air density, means forming a passage connecting opposite sides of the diaphragm, a bellows responsive to temperature of air in the air path for variably restricting the passage and being adapted to change the restriction from a relatively closed position toward at least one fully open position, and biasing means operative upon failure of the last-named bellows to change the last-named restriction toward at least one fully open position.

2. In a power plant comprising a burner, means forming a path for the flow of air to the burner, means forming a path for the flow of fuel to the burner, means forming a first orifice in the fuel path, means forming a second orifice in the fuel path in series with the first orifice, and means responsive both to the air-flow rate in the air path and to the drop of fuel pressure at the second orifice for controlling the first orifice to regulate the fuel-flow rate in the fuel path, the combination therewith, of means responsive to changes in air-flow rate of short duration for changing the opening of the second orifice to obtain a change in the fuel pressure drop thereat and in the relation of the fuel-flow rate to its effect upon the first-orifice-controlling means for balancing the aforesaid change in air-flow rate and thereby preventing adjustment of the first orifice to maintain the fuel-flow rate constant.

3. In a power plant comprising a burner, means forming a path for the flow of air to the burner, means forming a path for the flow of fuel to the burner, means forming a regulating orifice in the fuel path, means forming a first metering orifice in the fuel path in series with the regulating orifice, and means responsive to fuel pressures above and below the metering orifice and to the air-flow rate in the air path for controlling the regulating orifice to effect a fuel-flow rate in accordance with air-flow rate, the combination therewith, of means forming a second metering orifice in the fuel path in parallel with the first metering orifice and in series with the regulating orifice, and means responsive to changes in air-flow rate of short duration for changing the opening of the second metering orifice to obtain a change in fuel-pressure difference above and below the metering orifices for a given fuel-flow rate for balancing the aforesaid change in air-flow rate and thereby preventing adjustment of the regulating orifice to maintain the fuel-flow rate constant.

4. In a power plant comprising a burner, means forming a path for the flow of air to the burner, means forming a path for the flow of fuel to the burner, means forming a regulating orifice in the fuel path, and means responsive to fuel-flow and air-flow rates in the fuel and air paths for adjusting the regulating orifice to set the fuel-flow rate in accordance with the air-flow rate, the combination therewith, of means forming a compensating orifice in the fuel path, and means responsive to changes in air-flow rate of short duration for changing the opening of the compensating orifice to obtain a change in the relation of the fuel-flow rate to its effect upon the regulating-orifice-controlling means for balancing the aforesaid change in air-flow rate and thereby preventing adjustment of the regulating orifice to maintain the fuel-flow rate constant, the means for changing the opening of the compensating orifice.

5. In a power plant comprising a burner, means forming a path for the flow of air to the burner, means forming a path for the flow of fuel to the burner, means forming a regulating orifice in the fuel path, and means responsive to fuel-flow and air-flow rates for adjusting the regulating orifice to obtain a fuel-flow rate in accordance with fuel-flow rate, the combination therewith, of means forming a compensating orifice in the fuel path, and means for adjusting the compensating orifice in response to changes in air-flow rate of short duration to obtain a change in the relation of the fuel-flow rate to its effect upon the regulating-orifice-controlling means for balancing the aforesaid change in air-flow rate and thereby preventing adjustment of the regulating orifice to maintain the fuel-flow rate constant, said last mentioned adjusting means including a container having one wall associated with the compensating orifice, a second wall sensitive to changes in fuel-flow and air-flow rates, and a restricted passage for fuel adapted to pass fuel only slowly to and from the container for thereby permitting the container walls to have only slow relative movement.

6. A fuel-metering device comprising means forming an adjustable regulating orifice for fuel, air and fuel diaphragms subjected respectively, to air and fuel pressures indicative of air-flow and fuel-flow rates, means connecting the diaphragms with the regulating orifice for regulating the same to maintain a predetermined ratio of fuel-flow rate to air-flow rate, an idle spring associated with the regulating orifice, means forming a passage connecting opposite sides of the air diaphragm, a valve controlling the passage, and means interconnecting the valve and the idle spring for simultaneously causing the valve to open the passage and the idle spring to be shifted away from a position limiting the minimum setting of the regulating orifice and for simultaneously causing the valve to close the passage and permitting the idle spring to return to the position limiting setting of the regulating orifice.

7. In a power plant comprising a burner, means forming a path for the flow of air to the burner, means forming a path for the flow of fuel to the burner, means forming a regulating orifice in the fuel path, means forming a metering orifice in the fuel path, means responsive to the air-flow rate in the air path and fuel-flow rate in the fuel path for controlling the regulating orifice to regulate the fuel-flow rate in the fuel path; the combination therewith, of a lever, means associating a first portion of the lever with the metering orifice for adjusting the size of the metering orifice in accordance with the position of the said first portion of the lever, means for adjusting a second portion of the lever in accordance with air-flow rate, and means acting against a third portion of the lever to make the lever pivot about the second portion and to move the first portion of the lever for adjusting the metering orifice to change the fuel-air ratio, the change in fuel-air ratio producing a speed change of the power plant producing the said second portion of the lever to shift the lever about the third portion as a pivot to return the first portion to its original position, the metering orifice to its original size, and the fuel-air ratio to its original value.

8. In a power plant comprising a gas turbine, an air compressor driven by the turbine, a burner supplying combustion products driving the turbine, means forming a path for the flow of air from the compressor to the burner, means forming a path for the flow of fuel to the burner, means forming a regulating orifice in the fuel path, means forming a metering orifice in the fuel path, and means responsive to air-flow rate in the air path and fuel-flow rate in the fuel path for adjusting the regulating orifice to control the fuel-flow rate; the combination therewith, of yielding means maintaining the size of the regulating orifice, means responsive to change in air-flow rate for adjusting the size of the metering orifice to change the relation of the fuel-flow rate to its effect upon the controlling means for the regulating orifice for balancing the aforesaid change in air-flow rate and thereby preventing adjustment of the regulating orifice to maintain the fuel-flow rate constant, said last mentioned means including means giving way after a short time to provide for return of the metering orifice to its original size under the influence of the yielding means for making the controlling means for the regulating orifice respond to the change in air-flow rate after the short time, a lever, means associating a first portion of the lever with the metering orifice for adjusting the size of the metering orifice in accordance with the position of the said first portion of the lever, means for adjusting a second portion of the lever in accordance with air-flow rate, and means acting against a third portion of the lever to make the lever pivot about the second portion and to move the first portion of the lever for adjusting the metering orifice to change the fuel-air ratio, the change in fuel-air ratio producing a speed change of the power plant producing the said second portion of the lever to shift the lever about the third portion as a pivot to return the first portion to its original position, the metering orifice to its original size, and the fuel-air ratio to its original value.

9. In a power plant comprising a gas turbine, an air compressor driven by the turbine, a burner supplying combustion products driving the turbine, means forming a path for the flow of air from the compressor to the burner, means forming a path for the flow of fuel to the burner, means forming a regulating orifice in the fuel path, means forming a metering orifice in the fuel path, and means responsive to air-flow rate in the air path and fuel-flow rate in the fuel path for adjusting the regulating orifice to control the fuel-flow rate; the combination therewith, of means for adjusting the metering orifice in accordance with change in air-flow rate comprising a rod and a container having a restricted opening and a diaphragm wall connected to the rod and movable with respect to the rest of the container after a short time because of the restricted opening, resilient means for returning the metering orifice to an original size after a short time because of the aforesaid permitted movement of the diaphragm wall with respect to the rest of the container, a lever, means associating a first portion of the lever with the metering orifice for adjusting the size of the metering orifice in accordance with the position of the said first portion of the lever, means connecting a second portion of the lever with the rod, and means acting against a third portion of the lever to make the lever pivot about the second portion and to move the first portion of the lever for adjusting the metering orifice to change the fuel-air ratio, the change in fuel-air ratio producing a speed change of the compressor and turbine producing a change in air-flow rate acting at the said second portion of the lever to shift the lever about the third portion as a pivot to return the first portion to its original position, the metering orifice to its original size, and the fuel-air ratio to its original value.

10. In a power plant, a burner, means forming a path for the flow of fuel to the burner, means forming a path for the flow of air to the burner, means forming a metering orifice in the fuel path, means forming a regulating orifice in the fuel path, a fuel diaphragm subjected at opposite sides to the fuel pressures above and below the metering orifice, an air diaphragm subjected at opposite sides to air pressures in the air path having a difference indicative of air-flow rate, and means connected with the air and fuel diaphragms for adjusting the regulating orifice to maintain a predetermined ratio of fuel-flow rate to air-flow rate; the combination therewith, of means forming passage portions establishing communication between the opposite sides of the air diaphragm, means responsive to temperature of air in the air path for variably restricting a certain of said passage portions to make the aforesaid predetermined fuel-air ratio vary inversely with the temperature of air in the air path, an idle spring associated with the regulating orifice, a valve controlling another of said passage portions, and means interconnecting the valve and the idle spring for simultaneously causing the valve to open the other passage means and the idle spring to be shifted away from a position limiting the minimum setting of the regulating orifice and for simultaneously causing the valve to close the other passage means and permitting the idle spring to return to the position limiting setting of the regulating orifice.

11. In combination, a burner, means forming a path for the flow of air to the burner, means forming a path for the flow of fuel to the burner, a fuel valve to control the flow of fuel, a diaphragm connected to the fuel valve and subjected on opposite sides to pressures of air in the air path having a difference indicative of air-flow rate, means comprising passage forming portions establishing communication between opposite sides of the diaphragm, means forming an adjustable restriction in a certain of said passage forming portions and being responsive to temperature of air in the air path for adjustably restricting said certain of said passage forming portions to cause the fuel valve to make the fuel-flow rate vary inversely with the temperature of air in the air path, fuel valve positioning means movable from a first position corresponding to a relative low minimum rate of fuel flow caused by the fuel valve to a second position corresponding to a predeterminedly higher minimum rate of fuel flow caused by the fuel valve, valve means controlling another of said passage forming portions and being shiftable from a first position closing said other of said passage forming portions into a second open position opening said other of said passage forming portions, and mechanical means effective to interconnect said positioning and valve means and being manually movable for substantially simultaneously shifting both the positioning and the valve means from said first positions into said second positions to insure a fuel flow rate in excess of said relatively low minimum rate and unaffected by fluctuations in air flow.

12. In a power plant, a burner, means forming a path for the flow of fuel to the burner, means forming a path for the flow of air to the burner, means forming an adjustable regulating orifice in the fuel path, air and fuel diaphragms subjected respectively to air pressure and fuel pressure differential indicative of air-flow and fuel-flow rates, means connecting the diaphragms with the regulating orifice for regulating the same to maintain a predetermined ratio of fuel-flow rate to air-flow rate, an idle spring associated with the regulating orifice, means forming a passage connecting opposite sides of the air diaphragm, a valve controlling the passage and in combination therewith, a manually-set, selected operating condition indicating device including means interconnecting the valve and the idle spring for simultaneously causing the valve to open the passage and the idle spring to be shifted away from a position limiting the minimum setting of the regulating orifice and for simultaneously causing the valve to close the passage and permitting the idle spring to return to the position limiting setting of the regulating orifice.

13. In a power plant, a burner, means forming a path for the flow of fuel to the burner, means forming a path for the flow of air to the burner, means forming an adjustable regulating orifice in the fuel path, air and fuel diaphragms subjected respectively to air pressure and fuel pressure differential indicative of air-flow and fuel-flow rates, means connecting the diaphragms with the regulating orifice for regulating the same to maintain a predetermined ratio of fuel-flow rate to air-flow rate, an idle spring assocoated with the regulating orifice, means forming a passage connecting opposite sides of the air diaphragm, a valve controlling the passage and in combination therewith, a manually-set, selected operating condition indicating device including means interconnecting the valve and the idle spring for simultaneously causing the valve to open the passage and the idle spring to be shifted away from a position limiting the mimimum setting of the regulating orifice and for simultaneously causing the valve to close the passage and permitting the idle spring to return to the position limiting setting of the regulating orifice, means forming a second passage connecting the opposite sides of the air diaphragm, and means responsive to temperature of air in the air path and operative for variably restricting the second passage to make the aforesaid fuel-air ratio vary inversely with the temperature of the air in the air path.

14. In combination, a burner, means forming a path for the flow of air to the burner, means forming a path for the flow of fuel to the burner, a pressure movable diaphragm, means connected for movement with the diaphragm to control the flow of fuel in said fuel path, said diaphragm being subjected on opposite sides to pressures of air in the air path having a difference indicative of air flow rate, means forming a passage connecting opposite sides of the diaphragm, a valve-containing valve opening included in said passage, a thermal element responsive to temperature of air in the air path adapted to move said valve in a direction from a position of closely spaced juxtaposition to said valve opening toward a first fully open position as the temperature of air in the air path increases, and biasing means opposing movement, due to said thermal element, of said valve toward said first fully open position and being effective upon failure of said thermal element to move said valve in the opposite direction toward a second fully open position.

15. In combination, a burner, means forming a path for the flow of air to the burner, means forming a path for the flow of fuel to the burner, a pressure movable diaphragm, means connected for movement with said diaphragm to control the flow of fuel in said fuel path, said diaphragm being subjected on opposite sides to first and second pressures of air in the air path having a difference indicative of air flow rate, said first air pressure exceeding said second air pressure by the amount of said difference and having a communication through which said first air pressure is communicated to the diaphragm, a bellows responsive to density of the air in the air path for variably restricting said communication and being adapted to change the restriction toward its open position under condition of increasing air density, means forming a first passage connecting opposite sides of the diaphragm, a bellows responsive to temperature of air in the air path for variably restricting the first passage and being adapted to change the restriction from a relatively closed position toward at least one fully open position, biasing means operative upon failure of the last-named bellows to change the last-named restriction toward at least one fully open position, means forming a second passage connecting opposite sides of the diaphragm, and a fixed restriction included in said second passage.

JORMA O. SARTO.

REFERENCES CITED

The following references are of record in the file of this patent:

UNITED STATES PATENTS

| Number | Name | Date |
|---|---|---|
| 1,279,674 | Doble | Sept. 24, 1918 |
| 2,219,994 | Jung | Oct. 29, 1940 |
| 2,361,227 | Mock | Oct. 24, 1944 |
| 2,367,499 | Holley | Jan. 16, 1945 |
| 2,384,282 | Chandler | Sept. 4, 1945 |
| 2,392,055 | Mennesson | Jan. 1, 1946 |
| 2,405,888 | Holley | Aug. 13, 1946 |
| 2,407,115 | Udale | Sept. 3, 1946 |
| 2,447,261 | Mock | Aug. 17, 1948 |
| 2,447,267 | Mock | Aug. 17, 1948 |
| 2,465,550 | Orr | Mar. 29, 1949 |
| 2,486,223 | Stresen-Reuter | Oct. 25, 1949 |
| 2,529,100 | Orr | Nov. 7, 1950 |
| 2,545,703 | Orr | Mar. 20, 1951 |